(12) United States Patent
Sugimoto et al.

(10) Patent No.: US 12,138,962 B2
(45) Date of Patent: Nov. 12, 2024

(54) RUBBER COMPOSITION FOR TIRE

(71) Applicant: The Yokohama Rubber Co., Ltd., Kanagawa (JP)

(72) Inventors: Hiroki Sugimoto, Kanagawa (JP); Rie Nakajima, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 18/576,033

(22) PCT Filed: Mar. 25, 2022

(86) PCT No.: PCT/JP2022/014282
§ 371 (c)(1),
(2) Date: Jan. 2, 2024

(87) PCT Pub. No.: WO2023/281854
PCT Pub. Date: Jan. 12, 2023

(65) Prior Publication Data
US 2024/0262129 A1    Aug. 8, 2024

(30) Foreign Application Priority Data
Jul. 7, 2021 (JP) .................................. 2021-112737

(51) Int. Cl.
*C08L 9/06* (2006.01)
*B60C 1/00* (2006.01)
*C08K 3/00* (2018.01)
*C08K 3/36* (2006.01)

(52) U.S. Cl.
CPC .............. *B60C 1/0016* (2013.01); *C08K 3/36* (2013.01); *C08L 9/06* (2013.01); *C08L 2205/025* (2013.01); *C08L 2207/04* (2013.01)

(58) Field of Classification Search
CPC ................ C08L 9/06; B60C 1/00; C08K 3/00

USPC ......................................................... 524/789
See application file for complete search history.

(56) References Cited

U.S. PATENT DOCUMENTS

| 2018/0282444 A1* | 10/2018 | Arigo ...................... C08F 10/14 |
| 2020/0181369 A1* | 6/2020 | Yoshizawa ............ B60C 1/0016 |

FOREIGN PATENT DOCUMENTS

| JP | 2013-227400 A | 11/2013 |
| JP | 2016-089118 A | 5/2016 |
| JP | 2013-227375 A | 4/2017 |
| JP | 2017-75227 A | 4/2017 |
| JP | 2017-190364 A | 10/2017 |
| JP | 2019-104484 A | 6/2019 |
| JP | 2020-29474 A | 2/2020 |
| JP | 2020-75999 A | 5/2020 |
| WO | WO-2017209261 A1 * | 12/2017 ............... B60C 1/00 |

* cited by examiner

*Primary Examiner* — Deve V Hall
(74) *Attorney, Agent, or Firm* — Thorpe North & Western

(57) ABSTRACT

A rubber composition contains 10-50 parts by mass of a thermoplastic resin in 100 parts by mass of a diene rubber containing 60 mass % or more of a styrene-butadiene rubber having a styrene content of 5-30 mass % and a vinyl content of 10-35 mass %. In a mixture containing the diene rubber and the thermoplastic resin in a mass ratio of 1:1, a difference (Tga-Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is 5-50° C., and a difference (Tg2-Tg1) is 110-150° C. An amount of the thermoplastic resin is 30 mass % or more in 100 mass % total of a plasticizer component contained in the rubber composition.

12 Claims, No Drawings

RUBBER COMPOSITION FOR TIRE

TECHNICAL FIELD

The present technology relates to a rubber composition for a tire providing wet grip properties and wear resistance in a compatible manner.

BACKGROUND ART

Examples of important performances required for a tire include wet grip properties and wear resistance. To improve the wear resistance, typically, a method of reducing the glass transition temperature of a rubber composition for a tire and a method of increasing a blended amount of a filler having a high reinforcing property have been known. However, these methods have problems such as deterioration in wet grip properties and increase in heat build-up, and it has been difficult to provide wear resistance and wet grip properties in a compatible manner.

Meanwhile, to enhance wet grip properties, it has been proposed that the average glass transition temperature of a diene rubber be set high (e.g., see Japan Unexamined Patent Publication No. 2016-089118 A). When the average glass transition temperature of a diene rubber is set high, it is difficult to ensure rubber strength, and wear resistance may deteriorate. Thus, there has been a demand for providing wear resistance and wet grip properties of a rubber composition for a tire in a compatible manner at a high level.

SUMMARY

The present technology provides a rubber composition for a tire providing wet grip properties and wear resistance in a compatible manner.

The rubber composition for a tire of an embodiment of the present technology that achieves the object described above is a rubber composition containing from 10 to 50 parts by mass of a thermoplastic resin in 100 parts by mass of a diene rubber containing 60 mass % or more of a styrene-butadiene rubber, the styrene-butadiene rubber having a styrene content of from 5 to 30 mass % and a vinyl content of from 10 to 35 mass %, a mixture containing the diene rubber and the thermoplastic resin in a mass ratio of 1:1 satisfying a relationship where a difference (Tga-Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is from 5 to 50° C., and a difference (Tg2-Tg1) between the glass transition temperature (Tg2) of the thermoplastic resin and the average glass transition temperature (Tg1) of the diene rubber is from 110 to 150° C., and an amount of the thermoplastic resin being 30 mass % or more in 100 mass % total of a plasticizer component contained in the rubber composition.

According to the rubber composition for a tire of an embodiment of the present technology, wet grip properties and wear resistance can be improved beyond conventional levels.

The average glass transition temperature (Tg1) of the diene rubber is preferably −45° C. or lower, and the glass transition temperature (Tg2) of the thermoplastic resin is preferably from 30 to 80° C. The ratio of the mass of the thermoplastic resin to the mass of the styrene-butadiene rubber is preferably from 0.1 to 0.6.

The styrene-butadiene rubber preferably has a modification group at at least one terminal of a molecular chain of the styrene-butadiene rubber. Furthermore, the rubber composition for a tire preferably contains from 10 to 150 parts by mass of silica per 100 parts by mass of the diene rubber, and more preferably contains an alkylalkoxy silane containing an alkyl group having from 3 to 8 carbons in an amount of 1 to 20 mass % of the silica amount.

DETAILED DESCRIPTION

The rubber composition for a tire contains a diene rubber containing 60 mass % or more of a styrene-butadiene rubber. The styrene-butadiene rubber has a styrene content of from 5 to 30 mass % and a vinyl content of from 10 to 35 mass %, and has a specific relationship with the thermoplastic resin.

The styrene content in the styrene-butadiene rubber is from 5 to 30 mass %. When the styrene content is 5 mass % or more, good wet performance is achieved. When the styrene content is 30 mass % or less, deterioration in wear resistance can be suppressed. The styrene content is preferably from 10 to 25 mass %, and more preferably from 10 to 20 mass %. In the present specification, the styrene content of the styrene-butadiene rubber is determined by infrared spectroscopy (the Hampton method).

The vinyl content in the styrene-butadiene rubber is from 10 to 35 mass %. When the vinyl content is 10 mass % or more, good rolling resistance is achieved. When the vinyl content is 35 mass % or less, deterioration in wear resistance can be suppressed. The vinyl content is preferably from 20 to 35 mass %, and more preferably from 25 to 35 mass %. In the present specification, the vinyl content of the styrene-butadiene rubber is determined by infrared spectroscopy (the Hampton method).

The styrene-butadiene rubber is preferably a modified styrene-butadiene rubber having a modification group at at least one terminal of a molecular chain of the styrene-butadiene rubber. Examples of the modification group include a carboxy group, an amino group, a hydroxy group, an alkoxy group, a silyl group, an alkoxysilyl group, an oxysilyl group, a silanol group, an epoxy group, an amide group, an isocyanate group, an isothiocyanate group, a carbonyl group, and an aldehyde group.

The diene rubber is only required to be a diene rubber that is typically used in a tire. Examples of the diene rubber other than the styrene-butadiene rubber include natural rubber, isoprene rubber, butadiene rubber, styrene isoprene rubber, isoprene butadiene rubber, ethylene-propylene-diene copolymer rubber, chloroprene rubber, and acrylonitrile butadiene rubber. These diene rubbers may be modified with one or more functional groups. The type of the functional group is not particularly limited, and examples thereof include an epoxy group, carboxy group, amino group, hydroxy group, alkoxy group, silyl group, alkoxysilyl group, amide group, oxysilyl group, silanol group, isocyanate group, isothiocyanate group, carbonyl group, and aldehyde group.

The diene rubber containing the styrene-butadiene rubber preferably has the average glass transition temperature (Tg1) of −45° C. or lower. The average glass transition temperature (Tg1) of the diene rubber of −45° C. or lower is preferred because good wear resistance is achieved. The average glass transition temperature (Tg1) is more preferably from −80° C. to −50° C., and even more preferably from −75° C. to −60° C. In the present specification, for the glass transition temperature of each of the diene rubber, the thermoplastic resin, and the mixture thereof, a thermogram is obtained by differential scanning calorimetry (DSC) at a rate of temperature increase of 20° C./minute and the temperature at the midpoint of the transition region is defined as the glass transition temperature. When the diene rubber is an oil extended product, the glass transition temperature is the glass transition temperature of the diene rubber containing no oil-extending component (the oil).

The rubber composition for a tire contains 60 mass % or more of the styrene-butadiene rubber described above in 100 mass % of the diene rubber. When 60 mass % or more of the styrene-butadiene rubber is contained, wear resistance can be ensured. The amount of the styrene-butadiene rubber is preferably from 60 to 100 mass %, more preferably from 65 to 85 mass %, and even more preferably from 70 to 80 mass %.

For the rubber composition for a tire, it is necessary to combine the diene rubber and the thermoplastic resin in a manner that the diene rubber and the thermoplastic resin simultaneously satisfy the following relationships (i) and (ii). That is,
  (i) for a mixture in which the diene rubber and the thermoplastic resin are blended in a mass ratio of 1:1 (hereinafter, simply abbreviated as "mixture"), a difference (Tga-Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is from 5 to 50° C., and
  (ii) a difference (Tg2-Tg1) between the glass transition temperature (Tg2) of the thermoplastic resin and the average glass transition temperature (Tg1) of the diene rubber is from 110 to 150° C.

In the present specification, the average glass transition temperature (Tg1) of the diene rubber, the glass transition temperature (Tg2) of the thermoplastic resin, and the glass transition temperature (Tgm) of the mixture are measured by the method described above. Furthermore, the theoretical value (Tga) of the glass transition temperature of the mixture can be calculated as a weighted average value based on the glass transition temperatures and the mass ratio of the diene rubber and the thermoplastic resin.

As in (i) above, when the difference (Tga-Tgm) between the theoretical value (Tga) of the glass transition temperature of the mixture and the measurement value (Tgm) of the glass transition temperature of the mixture is set to 5° C. or higher, deterioration in wear resistance can be suppressed. Furthermore, when the difference (Tga-Tgm) is set to 50° C. or lower, deterioration in wet performance can be suppressed. The difference (Tga-Tgm) is preferably 40° C. or lower, more preferably 20° C. or lower, and even more preferably 11° C. or lower. Furthermore, the difference (Tga-Tgm) is preferably 6° C. or higher, more preferably 7° C. or higher, and even more preferably 8° C. or higher.

As in (ii) above, when the difference (Tg2-Tg1) between the glass transition temperature (Tg2) of the thermoplastic resin and the average glass transition temperature (Tg1) of the diene rubber is set to 110° C. or higher, good wet performance is achieved. Furthermore, when the difference (Tg2-Tg1) is set to 150° C. or lower, deterioration in wear resistance performance can be suppressed. The difference (Tg2-Tg1) is preferably from 115 to 140° C., and more preferably from 120 to 135° C.

When the rubber composition for a tire contains from 10 to 50 parts by mass of the thermoplastic resin per 100 parts by mass of the diene rubber, wet grip properties and wear resistance can be provided in a compatible manner. When the amount of the thermoplastic resin is less than 10 parts by mass, the effect of improving wet grip properties cannot be adequately achieved. When the amount of the thermoplastic resin is more than 50 parts by mass, the effect of improving wear resistance cannot be adequately achieved. The blended amount of the thermoplastic resin is preferably from 15 to 45 parts by mass, and more preferably from 20 to 40 parts by mass.

The amount of the thermoplastic resin is preferably 30 mass % or more in 100 mass % total of the plasticizer component contained in the rubber composition. Setting the amount of the thermoplastic resin to 30 mass % or more is preferred because the effect of improving wear resistance becomes significant. The amount of the thermoplastic resin is more preferably from 35 to 100 mass %, and even more preferably from 40 to 100 mass %, in 100 mass % total of the plasticizer component. Note that examples of the plasticizer component contained in the rubber composition include a thermoplastic resin, a natural oil, a synthetic oil, an oil-extending component (oil) contained in diene rubber, and a liquid rubber.

Furthermore, the ratio of the mass of the thermoplastic resin to the mass of the styrene-butadiene rubber described above is preferably from 0.1 to 0.6. The mass ratio of 0.1 or more is preferred because the distribution of the thermoplastic resin in the rubber composition becomes uniform. Furthermore, the mass ratio of 0.6 or less is preferred because the thermoplastic resin is dispersed in the rubber component, which serves as a matrix, in the rubber composition. The ratio of the mass of the thermoplastic resin to the mass of the styrene-butadiene rubber is more preferably from 0.2 to 0.6, and even more preferably from 0.3 to 0.5.

The glass transition temperature (Tg2) of the thermoplastic resin is preferably from 30 to 80° C., more preferably from 35 to 75° C., and even more preferably from 40 to 75° C. Setting the glass transition temperature (Tg2) to 30° C. or higher is preferred because excessive adhesion of the rubber composition can be suppressed. Furthermore, setting the glass transition temperature (Tg2) to 80° C. or lower is preferred because dissolution in the rubber becomes uniform.

The softening point of the thermoplastic resin is preferably from 80 to 125° C., more preferably from 90 to 125° C., and even more preferably from 95 to 125° C. Setting the softening point to 80° C. or higher is preferred because excessive adhesion of the rubber composition can be suppressed. Furthermore, setting the softening point to 125° C. or lower is preferred because dissolution in the rubber becomes uniform. In the present specification, the softening point of a thermoplastic resin is measured in accordance with JIS (Japanese Industrial Standard) K6220-1 (ring and ball method).

The thermoplastic resin is not particularly limited as long as the thermoplastic resin and the diene rubber simultaneously satisfy the relationships (i) and (ii) described above. Examples of the thermoplastic resin include a terpene resin, a terpene phenol resin, a rosin resin, a rosin ester resin, a C5/C9 resin, and a coumarone-indene resin. Among these, a C5/C9 resin and a terpene resin are preferred.

The rubber composition for a tire preferably contains from 10 to 150 parts by mass of silica per 100 parts by mass of the diene rubber, and preferably contains an alkylalkoxy silane containing an alkyl group having from 3 to 8 carbons in an amount of 1 to 20 mass % of the silica amount. Blending of 1 mass % or more of alkylalkoxysilane with respect to the silica amount can improve dispersibility of the silica. Furthermore, blending of 20 mass % or less is preferred because deterioration in a reinforcing property of the silica can be suppressed. The alkylalkoxysilane is blended in an amount of more preferably from 3 to 15 mass %, and even more preferably from 4 to 12 mass %, of the silica amount.

The alkyl group having from 3 to 8 carbons may be in a straight-chain, branched, or cyclic form, or a combination of these, but is preferably in a straight-chain form. Examples of the alkyl group include a propyl group, a butyl group, a pentyl group, a hexyl group, a heptyl group, and an octyl group, and an octyl group is more preferred.

The alkylalkoxysilane is preferably an alkyltrialkoxysilane having three alkoxy groups. Examples of the alkoxy group include a methoxy group, an ethoxy group, a propoxy group, and a butoxy group, and an ethoxy group is preferred.

The rubber composition for a tire contains from 10 to 150 parts by mass of the silica in 100 parts by mass of the diene rubber. Blending of 10 parts by mass or more of the silica can improve wet grip properties and wear resistance. Furthermore, blending of 150 parts by mass or less of the silica can suppress deterioration in rolling resistance. The blended amount of the silica is preferably from 50 to 135 parts by mass, and more preferably from 60 to 125 parts by mass. Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

In the rubber composition for a tire, a silane coupling agent is preferably blended together with the silica, and good dispersibility of the silica can be achieved. As the silane coupling agent, a type of silane coupling agent that is typically blended together with silica can be used. The silane coupling agent is blended in an amount of preferably from 5 to 15 mass %, and more preferably from 8 to 12 mass %, of the silica amount.

The rubber composition for a tire can contain another inorganic filler besides the silica. Examples of such other inorganic fillers include carbon black, calcium carbonate, magnesium carbonate, talc, clay, mica, alumina, aluminum hydroxide, titanium oxide, and calcium sulfate. One type of these other fillers can be used alone, or a combination of two or more types of these can be used.

The rubber composition for a tire may also contain various additives that are commonly used in a rubber composition for a tire within a range that does not impair the present technology. Examples thereof include vulcanization or crosslinking agents, vulcanization accelerators, anti-aging agents, plasticizers, processing aids, liquid polymers, and thermosetting resins. These additives may be kneaded by any commonly known method to form a rubber composition for a tire, and can be used for vulcanization or crosslinking. Blended amounts of these additives may be any known amount, so long as the present technology is not hindered.

The rubber composition for a tire described above is preferably a rubber composition for a tire tread and can suitably constitute a tread portion of a tire. A tire having a tread portion made of the rubber composition for a tire of an embodiment of the present technology can provide wet grip properties and wear resistance in a compatible manner. Note that the tire may be a pneumatic tire or a non-pneumatic tire.

Embodiments according to the present technology are further described below by Examples. However, the scope of the present technology is not limited to these Examples.

EXAMPLE

Each of rubber compositions for tires (Examples 1 to 6, Standard Example 1, and Comparative Examples 1 to 5) was prepared according to the formulations listed in Table 1 with the compounding agents listed in Table 2 used as common components. With the exception of the sulfur and the vulcanization accelerators, the components were kneaded in a 1.7 L sealed Banbury mixer for 5 minutes, then discharged from the mixer, and cooled at room temperature. This was placed in the 1.7 L sealed Banbury mixer described above, and the sulfur and the vulcanization accelerators were then added and mixed, and thus a rubber composition for a tire was prepared. The blended amounts of the compounding agents shown in Table 2 are expressed as values in parts by mass with respect to 100 parts by mass of the diene rubbers shown in Table 1.

A vulcanized rubber sheet was produced by vulcanizing the obtained rubber composition for a tire at 160° C. for 20 minutes in a 15 cm×15 cm×0.2 cm mold. Then, the dynamic visco-elasticity was measured by the following method and used as an indicator of wet grip properties. Furthermore, the wear resistance was measured by the following method.

Wet Grip Properties

Using a viscoelastic spectrometer, available from Toyo Seiki Seisaku-sho, Ltd., dynamic visco-elasticity of the vulcanized rubber sheet obtained as described above was measured at an initial strain of 10%, an amplitude of ±2%, and a frequency of 20 Hz, and the tan δ at 0° C. was determined. The obtained results are shown in the "Wet performance" row, with an index value of Standard Example 1 being assigned the value of 100. A larger index value indicates superior wet grip properties.

Wear Resistance

The abrasion loss of the vulcanized rubber sheet obtained as described above was measured in accordance with JIS K 6264-1, 2:2005 using a Lambourn abrasion test machine (available from Iwamoto Seisakusho Co., Ltd.) in conditions of a temperature of 20° C. and a slip rate of 50%. Each of the obtained results was expressed as an index value obtained by calculating a reciprocal of the abrasion loss, with a value of Standard Example 1 being assigned the value of 100, and shown in the "wear resistance" row. A larger index value indicates a smaller abrasion loss and excellent wear resistance.

TABLE 1-1

|  |  | Standard Example 1 | Comparative Example 1 | Comparative Example 2 |
|---|---|---|---|---|
| SBR-1 | Parts by mass | 70 | 30 | 70 |
| SBR-2 | Parts by mass | 30 | 70 | 30 |
| Resin 1 | Parts by mass |  | 40 | 5 |
| Resin 2 | Parts by mass |  |  |  |
| Silica | Parts by mass | 90 | 90 | 90 |
| Carbon black | Parts by mass | 5 | 5 | 5 |
| Coupling agent | Parts by mass | 7.2 | 7.2 | 7.2 |
| Aroma oil | Parts by mass | 50 | 10 | 45 |
| Average Tg (Tg1) of diene rubber | ° C. | −52 | −41 | −52 |
| Tg (Tg2) of resin | ° C. | — | 75 | 75 |
| Theoretical value (Tga) | ° C. | — | −8 | −46 |

TABLE 1-1-continued

|  |  | Standard Example 1 | Comparative Example 1 | Comparative Example 2 |
|---|---|---|---|---|
| Measurement value (Tgm) | °C. | — | −21 | −52 |
| Difference (Tg2 − Tg1) | °C. | — | 116 | 127 |
| Difference (Tga − Tgm) | °C. | — | 13 | 5 |
| Resin/all plasticizers | — | 0.0 | 0.8 | 0.1 |
| Resin/SBR-1 | — | 0.0 | 1.3 | 0.1 |
| Wear resistance | Index value | 100 | 95 | 102 |
| Wet performance | Index value | 100 | 103 | 95 |

TABLE 1-2

|  |  | Comparative Example 3 | Comparative Example 4 | Comparative Example 5 |
|---|---|---|---|---|
| SBR-1 | Parts by mass | 70 | 70 | 100 |
| SBR-2 | Parts by mass | 30 | 30 |  |
| Resin 1 | Parts by mass | 55 |  | 65 |
| Resin 2 | Parts by mass |  | 40 |  |
| Silica | Parts by mass | 90 | 90 | 90 |
| Carbon black | Parts by mass | 5 | 5 | 5 |
| Coupling agent | Parts by mass | 7.2 | 7.2 | 7.2 |
| Aroma oil | Parts by mass | 0 | 10 | 10 |
| Average Tg (Tg1) of diene rubber | °C. | −52 | −52 | −61 |
| Tg (Tg2) of resin | °C. | 75 | 38 | 75 |
| Theoretical value (Tga) | °C. | −7 | −27 | −7 |
| Measurement value (Tgm) | °C. | −18 | −35 | −58 |
| Difference (Tg2 − Tg1) | °C. | 127 | 90 | 136 |
| Difference (Tga − Tgm) | °C. | 11 | 8 | 51 |
| Resin/all plasticizers | — | 1.0 | 0.8 | 0.8 |
| Resin/SBR-1 | — | 0.8 | 0.6 | 0.7 |
| Wear resistance | Index value | 99 | 102 | 98 |
| Wet performance | Index value | 110 | 98 | 102 |

TABLE 1-3

|  |  | Example 1 | Example 2 | Example 3 |
|---|---|---|---|---|
| SBR-1 | Parts by mass | 70 | 70 | 70 |
| SBR-2 | Parts by mass | 30 | 30 | 30 |
| Resin 1 | Parts by mass | 40 | 10 | 50 |
| Resin 2 | Parts by mass |  |  |  |
| Silica | Parts by mass | 90 | 90 | 90 |
| Carbon black | Parts by mass | 5 | 5 | 5 |
| Coupling agent | Parts by mass | 7.2 | 7.2 | 7.2 |
| Aroma oil | Parts by mass | 10 | 23 | 0 |
| Average Tg (Tg1) of diene rubber | °C. | −52 | −52 | −52 |
| Tg (Tg2) of resin | °C. | 75 | 75 | 75 |
| Theoretical value (Tga) | °C. | −16 | −41 | −10 |
| Measurement value (Tgm) | °C. | −24 | −48 | −20 |
| Difference (Tg2 − Tg1) | °C. | 127 | 127 | 127 |
| Difference (Tga − Tgm) | °C. | 8 | 8 | 10 |
| Resin/all plasticizers | — | 0.8 | 0.3 | 1.0 |
| Resin/SBR-1 | — | 0.6 | 0.1 | 0.7 |
| Wear resistance | Index value | 120 | 105 | 103 |
| Wet performance | Index value | 108 | 102 | 108 |

TABLE 1-4

|  |  | Example 4 | Example 5 | Example 6 |
|---|---|---|---|---|
| SBR-1 | Parts by mass | 70 | 70 | 70 |
| SBR-2 | Parts by mass | 30 | 30 | 30 |
| Resin 1 | Parts by mass | 40 | 15 | 10 |
| Resin 2 | Parts by mass |  |  |  |
| Silica | Parts by mass |  | 90 | 90 |
| Carbon black | Parts by mass | 95 | 5 | 5 |
| Coupling agent | Parts by mass |  | 7.2 | 7.2 |
| Aroma oil | Parts by mass | 20 | 35 | 40 |
| Average Tg (Tg1) of diene rubber | °C. | −52 | −52 | −52 |
| Tg (Tg2) of resin | °C. | 75 | 75 | 75 |
| Theoretical value (Tga) | °C. | −16 | −36 | −41 |
| Measurement value (Tgm) | °C. | −25 | −46 | −48 |
| Difference (Tg2 − Tg1) | °C. | 127 | 127 | 127 |
| Difference (Tga − Tgm) | °C. | 9 | 10 | 7 |
| Resin/all plasticizers | — | 0.7 | 0.3 | 0.2 |
| Resin/SBR-1 | — | 0.6 | 0.2 | 0.1 |
| Wear resistance | Index value | 130 | 103 | 106 |
| Wet performance | Index value | 101 | 102 | 107 |

TABLE 2

| Common formulation of rubber compositions | |
|---|---|
| Stearic acid | 2.0 Parts by mass |
| Zinc oxide | 3.0 Parts by mass |
| Anti-aging agent | 2.0 Parts by mass |
| Sulfur | 2.0 Parts by mass |
| Vulcanization accelerator 1 | 1.0 Parts by mass |
| Vulcanization accelerator 2 | 2.0 Parts by mass |

In Tables 1 and 2, the types of raw materials used are as follows.

SBR-1: Modified solution-polymerized styrene-butadiene rubber containing a hydroxy group, NS612, available from ZS Elastomers Co., Ltd.; glass transition temperature: −61° C.: styrene content: 15 mass %; vinyl content: 31 mass %.

SBR-2: Solution-polymerized styrene-butadiene rubber, F3420, available from Asahi Kasei Corporation: glass transition temperature: −32° C.: styrene content: 37 mass %; vinyl content: 44 mass %

Resin-1: C9 resin, IMPERA E1875, available from Eastman: glass transition temperature: 75° C.

Resin-2: C5/C9 resin, IMPERAD 1506, available from Eastman: glass transition temperature: 38° C.

Silica: ZEOSIL 1165MP, available from Solvay: CTAB adsorption specific surface area: 160 m²/g Carbon black: SEAST 9M, available from Tokai Carbon Co., Ltd.: nitrogen adsorption specific surface area: 150 m2/g Coupling agent: Silane coupling agent, Si69, available from Evonik Degussa, bis(triethoxysilylpropyl)tetrasulfide Aroma oil: Extract No. 4S, available from Showa Shell Sekiyu K. K.

Stearic acid: beads stearic acid, available from NOF Corporation

Zinc oxide: Zinc Oxide III, available from Seido Chemical Industry Co., Ltd.

Anti-aging agent: Santoflex 6PPD, available from Flexsys

Sulfur: MUCRON OT-20, available from Shikoku Chemicals Corporation.

Vulcanization accelerator-1: NOCCELER CZ, available from Ouchi Shinko Chemical Industrial Co., Ltd.

Vulcanization accelerator-2: Perkacit DPG, available from Flexsys

As can be seen from Table 1, it was confirmed that the rubber compositions for tires of Examples 1 to 6 each had excellent wet grip properties and wear resistance.

Because the rubber composition for a tire of Comparative Example 1 contained less than 60 mass % of the specific styrene-butadiene rubber, wear resistance was poor.

Because the rubber composition for a tire of Comparative Example 2 contained less than 10 parts by mass of the thermoplastic resin, wet grip properties were poor.

Because the rubber composition for a tire of Comparative Example 3 contained more than 50 parts by mass of the thermoplastic resin, wear resistance was poor.

Because the rubber composition for a tire of Comparative Example 4 had the difference (Tg2-Tg1) between Tg1 of the diene rubber and Tg2 of the thermoplastic resin of lower than 110° C., wet grip properties were poor.

Because the rubber composition for a tire of Comparative Example 5 had the difference (Tga-Tgm) between the theoretical value (Tga) and the measurement value (Tgm) of the glass transition temperature of the mixture containing the diene rubber and the thermoplastic resin in the mass ratio of 1:1 of higher than 50° C. and contained more than 50 parts by mass of the thermoplastic resin, wear resistance was poor.

The invention claimed is:

1. A rubber composition for a tire, the rubber composition comprising from 10 to 50 parts by mass of a thermoplastic resin in 100 parts by mass of a diene rubber containing 60 mass % or more of a styrene-butadiene rubber, the styrene-butadiene rubber having a styrene content of from 5 to 30 mass % and a vinyl content of from 10 to 35 mass %, a mixture containing the diene rubber and the thermoplastic resin in a mass ratio of 1:1 satisfying a relationship where a difference (Tga-Tgm) between a theoretical value (Tga) of a glass transition temperature of the mixture calculated based on an average glass transition temperature (Tg1) of the diene rubber and a glass transition temperature (Tg2) of the thermoplastic resin, and a measurement value (Tgm) of a glass transition temperature of the mixture, is from 5 to 50° C., and a difference (Tg2-Tg1) between the glass transition temperature (Tg2) of the thermoplastic resin and the average glass transition temperature (Tg1) of the diene rubber is from 110 to 150° C., and an amount of the thermoplastic resin being 30 mass % or more in 100 mass % total of a plasticizer component contained in the rubber composition.

2. The rubber composition for a tire according to claim 1, wherein the average glass transition temperature (Tg1) of the diene rubber is −45° C. or lower.

3. The rubber composition for a tire according to claim 1, wherein a ratio of a mass of the thermoplastic resin to a mass of the styrene-butadiene rubber is from 0.1 to 0.6.

4. The rubber composition for a tire according to claim 1, wherein the glass transition temperature (Tg2) of the thermoplastic resin is from 30 to 80° C.

5. The rubber composition for a tire according to claim 1, wherein the styrene-butadiene rubber contains a modification group at at least one terminal of a molecular chain of the styrene-butadiene rubber.

6. The rubber composition for a tire according to claim 1, further comprising from 10 to 150 parts by mass of silica per 100 parts by mass of the diene rubber.

7. The rubber composition for a tire according to claim 6, further comprising an alkylalkoxysilane containing an alkyl group having from 3 to 8 carbons in an amount of 1 to 20 mass % of the silica amount.

8. The rubber composition for a tire according to claim 2, wherein a ratio of a mass of the thermoplastic resin to a mass of the styrene-butadiene rubber is from 0.1 to 0.6.

9. The rubber composition for a tire according to claim 8, wherein the glass transition temperature (Tg2) of the thermoplastic resin is from 30 to 80° C.

10. The rubber composition for a tire according to claim 9, wherein the styrene-butadiene rubber contains a modification group at at least one terminal of a molecular chain of the styrene-butadiene rubber.

11. The rubber composition for a tire according to claim 10, further comprising from 10 to 150 parts by mass of silica per 100 parts by mass of the diene rubber.

12. The rubber composition for a tire according to claim 11, further comprising an alkylalkoxysilane containing an alkyl group having from 3 to 8 carbons in an amount of 1 to 20 mass % of the silica amount.

\* \* \* \* \*